(12) United States Patent
Lin

(10) Patent No.: US 12,513,783 B2
(45) Date of Patent: Dec. 30, 2025

(54) ELECTRIC-HEATING ASSEMBLY FOR CLOTHING

(71) Applicant: XIAMEN WIKEY INDUSTRY & TRADE CO., LTD., Xiamen (CN)

(72) Inventor: Weiwen Lin, Xiamen (CN)

(73) Assignee: XIAMEN WIKEY INDUSTRY & TRADE CO., LTD., Xiamen (CN)

( * ) Notice: Subject to any disclaimer, the term of this patent is extended or adjusted under 35 U.S.C. 154(b) by 1037 days.

(21) Appl. No.: 17/563,097

(22) Filed: Dec. 28, 2021

(65) Prior Publication Data

US 2023/0247730 A1 Aug. 3, 2023

(30) Foreign Application Priority Data

Oct. 30, 2020 (CN) .......................... 202022479959.1

(51) Int. Cl.
*H05B 3/34* (2006.01)
*A41D 13/005* (2006.01)

(52) U.S. Cl.
CPC ......... *H05B 3/342* (2013.01); *A41D 13/0051* (2013.01); *H05B 2203/036* (2013.01)

(58) Field of Classification Search
CPC .............. A41D 13/0051; H05B 1/0272; H05B 2203/036; H05B 3/06; H05B 3/34; H05B 3/342
USPC ....................................................... 219/545
See application file for complete search history.

(56) References Cited

U.S. PATENT DOCUMENTS

| | | | | |
|---|---|---|---|---|
| 3,729,613 | A * | 4/1973 | Deloire | A41D 13/0051 219/211 |
| 4,710,593 | A * | 12/1987 | Hall, Jr. | H01R 4/021 337/191 |
| 5,231,758 | A * | 8/1993 | Schauer | H01R 4/021 439/492 |
| 5,986,243 | A * | 11/1999 | Campf | H05B 3/36 219/211 |
| 6,389,681 | B1 * | 5/2002 | Rock | H05B 3/342 29/623.5 |
| 6,888,108 | B2 * | 5/2005 | Carr | H02M 3/33523 363/21.01 |
| 2005/0016982 | A1 * | 1/2005 | Campf | H05B 1/0272 219/211 |
| 2011/0026233 | A1 * | 2/2011 | Hong | H05K 1/0283 361/679.01 |

(Continued)

*Primary Examiner* — Sang Y Paik
(74) *Attorney, Agent, or Firm* — JEEN IP LAW, LLC

(57) ABSTRACT

An electric-heating assembly adapted to be attached to an article of clothing including: a power supply module, a heating module, and an electric-conductive module. The electric-conductive module is electrically connected between the power supply module and heating module for transmitting electricity from the power supply module to the heating module. The electric-conductive module defining a first inlet terminal and a first outlet terminal is formed by fixing at least one pair of conductive wires on an elastic strip in a stretchable manner, and the conductive wires of the same pair respectively allowing electricity to flow in and out to form a closed circuit with other electrical elements are arranged together to be attached to the elastic strip simultaneously and extend in the same pattern. The electric-heating assembly is controlled by an operable controller to turn on or off.

11 Claims, 8 Drawing Sheets

(56) References Cited

U.S. PATENT DOCUMENTS

2011/0074380 A1\* 3/2011 Jeon ........................ H05B 3/56
174/250

\* cited by examiner

ELECTRIC-HEATING ASSEMBLY FOR CLOTHING

CROSS-REFERENCE TO RELATED APPLICATIONS

This is an application which is based upon and claims priority to Chinese Patent Application No. 202022479959.1, filed on Oct. 30, 2020, the entire content of which is incorporated herein by reference.

TECHNICAL FIELD

The present disclosure generally relates to apparel, in particular to an electric-heating assembly for clothing.

BACKGROUND

In some cold areas, people needs to wear layers of clothing and warm clothes such as down jackets, thick pants, and thick shoes to keep warm, which is bulky. Although electrically heated clothing has been around for years, the existing electric-heating garments still have the following drawbacks: (1) the existing electric-heating assembly for clothing usually has conductive wires and power supply unit fixed to the clothing, while nowadays people tends to wash the clothes by washing machine, especially in cold winter, the electrical assembly suffering from frequent washing and mechanical beating causes element failure easily; (2) usually, there are several separately applied conductive wires connecting the power supply and heating plate, and the wires are easy to twine with each other, especially after machine washing, which makes it troublesome to organize the cloth and makes the user feel uncomfortable when wearing it; (3) the conductive wires have no elasticity, so the wires must have extra length to ensure the flexibility and extensibility of the clothing, or the action of user will be restricted; (4) the connectors between the wire and the power supply or heating plate suffering frequent and intensive stretch break easily.

Thus, there remains a need for new and improved clothing with electric-heating assembly which is durable, machine washable, more comfortable for wearing, and easy to take care of.

SUMMARY

In view of the drawbacks of the prior art, it is an object of the present disclosure to provide an electric-heating assembly adapted to be attached to an article of clothing comprising: a power supply module, a heating module, and an electric-conductive module. The electric-conductive module is electrically connected between the power supply module and heating module for transmitting electricity from the power supply to the heating module. The electric-conductive module defining a first inlet terminal and a first outlet terminal is formed by fixing at least one pair of conductive wires on an elastic strip in a stretchable manner, and the conductive wires of the same pair respectively allowing electricity to flow in and out to form a closed circuit with other electrical elements are arranged in the same pattern. The electric-heating assembly is controlled by an operable controller to turn on or off.

Preferably, the first inlet terminal of the electric-conductive module is connected to an adapter, the first outlet terminal of the electric-conductive module is connected to the heating module by a connector, and the power supply module is electrically and detachably connected to the adapter.

Preferably, the connector comprises a conductive metal connecting between corresponding conductive wires and an insulation cover encapsulated outside uncovered conductive portions.

Preferably, the conductive metal is a conductive metal plate, the corresponding conductive wires are attached to opposite sides of the conductive metal plate, and the insulation cover encapsulates outside the uncovered conductive portions by injection molding to fix an insulation layer of the conductive wires with the insulation cover.

Preferably, the elastic strip is a fabric made of strands including elastic threads, the conductive wires extend from the first inlet terminal to the first outlet terminal in a zigzag pattern with curved turns in alternating directions, and the conductive wires are fixed on a surface of the fabric by strands weaving together with the fabric.

Preferably, the conductive wires are fixed on a surface of the fabric by strands weaving together with the fabric upon non-curved segments between the curved bends.

Preferably, the fabric defines a length direction from the inlet terminal to the outlet terminal and a width direction perpendicular to the length direction, the fabric includes elastic bands and flexible bands that are arranged in an alternating manner along the width direction, the flexible bands are formed by strands freely connecting between the elastic bands to provide flexibility when the elastic bands are stretched, and the conductive wires are fixed in a middle elastic band of the fabric.

Preferably, the conductive wires are alternatively twisted around the elastic strip in a middle.

Preferably, a fabric cover is wrapped outside the conductive wires.

Preferably, the fabric cover comprises a main body directly wrapped outside the conductive wires and a connecting portion extending out from a side of the main body to be sewed with the clothing.

Preferably, the heating module comprises one or more heating plates, each heating plate includes two fixing covers and a heating wire fixed between the two fixing covers, the heating wire defines a second inlet terminal and a second outlet terminal to be connected with the first outlet terminal, and the heating wire is adapted to extend from the second inlet terminal to the second outlet terminal in a second pattern to heat different parts of the clothing in a united intensity or different intensities.

Preferably, the heating wire is arranged in a/an regular or irregular zigzag manner with first turns in alternating directions from the second inlet terminal to the second outlet terminal.

Preferably, segments between the first turns are further arranged in a/an regular or irregular zigzag manner with second turns in alternating directions.

Preferably, portions of the fixing covers opposite to corresponding turns of the second pattern are each provided with a cut to provide extra flexibility.

Preferably, the heating module comprises one or more heating plates, each heating plate includes two fixing covers and a heating wire fixed between the two fixing covers, the heating wire define a second inlet terminal and a second outlet terminal to be connected with the first outlet terminal, and the heating wire is adapted to extend from the second inlet terminal to the second outlet terminal in a second pattern. The second pattern of the heating wire includes a first part and a second part connected to each other, the first part defines a first periphery with zigzag pattern inside the first periphery, and the second part defines a second periphery with an irregular rectangle shape inside the second periphery, so that the first part and the second part of the heating plate can provide different heating intensities.

Preferably, the operable controller is one item selected from a group consisting of a mechanical switcher, an infrared remote controller, a Bluetooth remote controller.

Another object of the present disclosure is to provide an electric-heating assembly adapted to be attached to an article of clothing comprising: a power supply module, a heating module, and an electric-conductive module. The electric-conductive module is electrically and respectively connected to the power supply module and heating module for transmitting electricity from the power supply module to the heating module. The electric-conductive module includes a wire organizer, a main conductive line led in the wire organizer and slave conductive lines led out from the wire organizer for connecting with the heating module and an adapter to be connected to the power supply, the main conductive line or the slave conductive lines are formed by fixing at least one pair of conductive wires on an elastic strip in a stretchable manner, and the conductive wires of the same pair respectively allowing electricity to flow in and out to form a closed circuit with other electrical elements are arranged in the same pattern. The electric-heating assembly is controlled by an operable controller connected to the main conductive line to turn on or off.

Preferably, the conductive wires are alternatively twisted around the elastic strip in a middle.

Preferably, a fabric cover is wrapped outside the conductive wires.

Preferably, the wire organizer comprises an insulation casing for covering and protecting a connection joint of the main conductive line and the slave conductive lines.

The present disclosure at least has the following advantages: (1) an electric-heating assembly adapted to be attached to an article of clothing may suffer from frequent washing and should have a good extensibility to meet the requirements of flexible actions, the conductive wires fixed on an elastic strip in a stretchable manner provide a good extensibility and flexibility, as well as reducing the mechanical damage caused by machine washing because the elastic strip prevents the conductive wires from direct collisions and frictions; (2) the power supply module is electrically and detachably connected to the electric-conductive module through the adapter, so that the power supply module may be removed when washing the clothing, thereby further reducing the mechanical damages to the electric-conductive module brought by machine washing and the power supply may be charged separately; (3) the heating wire of heating plate may be arranged in different patterns to increase the heating effects or heat different parts of the body with different intensities; (4) the present disclosure further provides an electric-heating assembly with a wire organizer, a main conductive line is led in the wire organizer and slave conductive lines are led out from the wire organizer for connecting with the heating module and an adapter to be connected to the power supply, so the number of conductive wires is greatly reduced, and the wiring of conductive lines is simpler and easy to organize.

DETAILED DESCRIPTION OF THE DRAWINGS

In order to clearly explain the embodiments of the present disclosure, the drawings that would be used in describing the embodiments will briefly introduced below. It should be understood that the drawings illustrated below merely includes some of the embodiments of the present disclosure and should not be considered as limiting the scope of the present disclosure. For those of ordinary skill in the art, other drawings may be derived based on these drawings without creative effort.

DETAILED DESCRIPTION OF THE EMBODIMENTS

Figure 1:
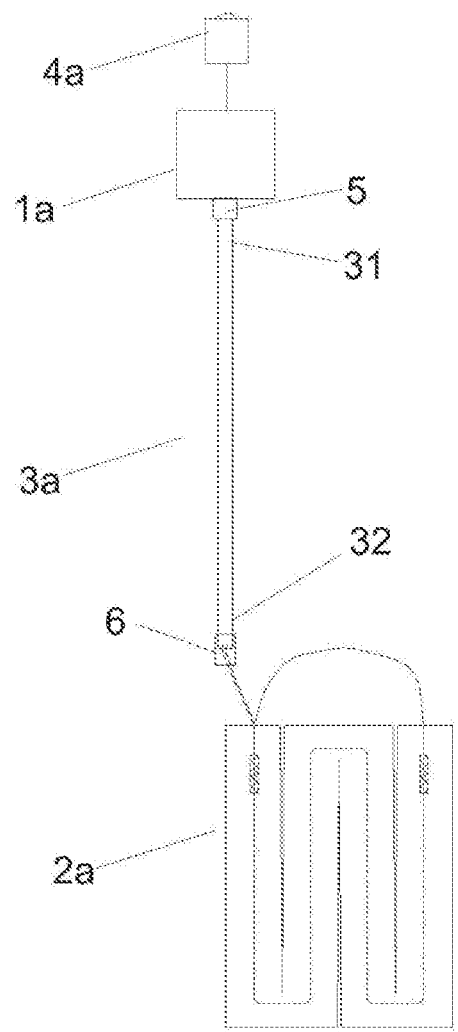
FIG. 1 is a structural schematic diagram of an electric-heating assembly according to an embodiment of the present disclosure.
Figure 2:
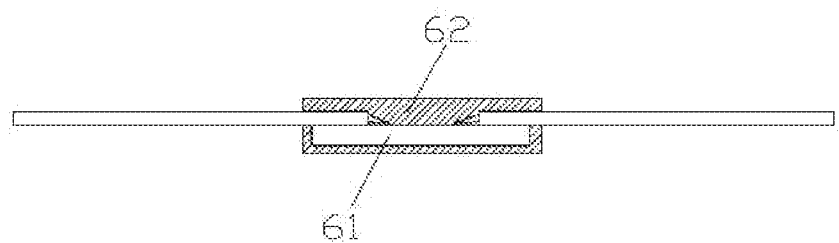
FIG. 2 is a cross-section view of a connector of the electric-heating assembly according to an embodiment of the present disclosure.
Figure 3:
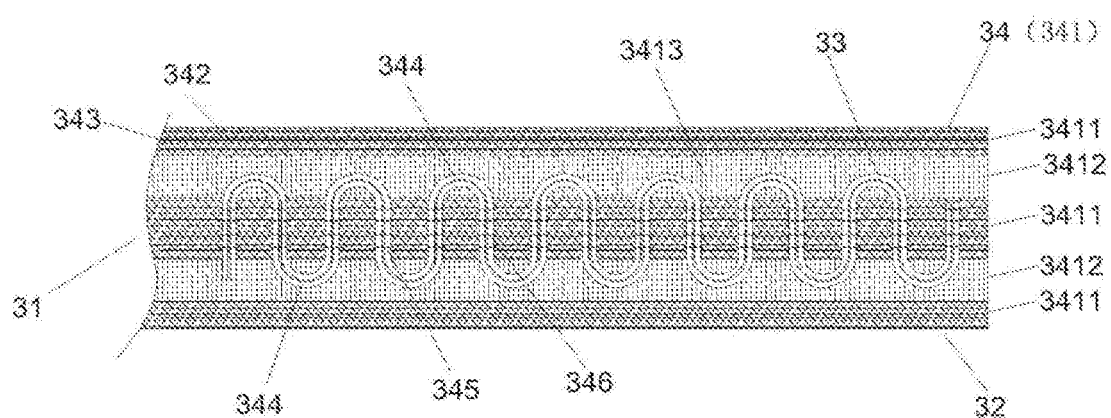
FIG. 3 is a schematic diagram of a conductive module according an embodiment of the present disclosure.

In order to make the objectives, technical solutions, and advantages of the embodiments of the present disclosure clearer, the technical solutions of the embodiments of the present disclosure will be described clearly and completely below with reference to the drawings of the embodiments of the present disclosure. Obviously, the described embodiments are parts of, but not all of, the embodiments of the present disclosure. Based on the embodiments of the present disclosure, all other embodiments derived by those of ordinary skills in the art without creative effort fall within the scope of protection of the present disclosure. Accordingly, the following detailed description of the embodiments of the present disclosure shown in the drawings is not intended to limit the scope of protection of the present disclosure, but merely to represent selected embodiments of the present disclosure. Based on the embodiments of the present disclosure, all other embodiments derived by those of ordinary skills in the art without creative effort fall within the scope of protection of the present disclosure.

In the description of the present disclosure, the terms "first", "second" are used only for descriptive purposes and cannot be understood as indicating or implying relative importance or implying the number of indicated technical features. Thus, a characteristic that is referred to by "first" and "second" may include, expressly or implicitly, one or more of the characteristics. Also, it should be noted that the terms of "up", "down", "inside/inner", "outside/outer", "front end", "rear end", "two ends", "one end", "another end", "one side", "another side" for indicating the location or orientation are based on the location or orientation shown in the drawings for the sake of simplifying the description of the present disclosure, rather than indicate or imply that the indicated device or component must have specific location or orientation, or be constructed and operated by specific orientation. These terms should not be understood as limits to the present disclosure.

In the description of the present disclosure, it should be noted that, unless otherwise clearly defined, the terms "provide/arrange", "connect", etc. should be understood in a broad sense. For example, "connect" may be interpreted as a fixed connection, a detachable connection, or an integrated connection, it may also be interpreted as a mechanical connection or an electrical connection, or a direct connection or an indirect connection through an intermediate medium. Optionally, it may refer to the communication of two components. For those of ordinary skill in the art, the meaning of the above-mentioned terms in the present disclosure should be understood under specific circumstances.

The content of the present disclosure will be described in detail below in terms of the embodiments.

Figure 4:
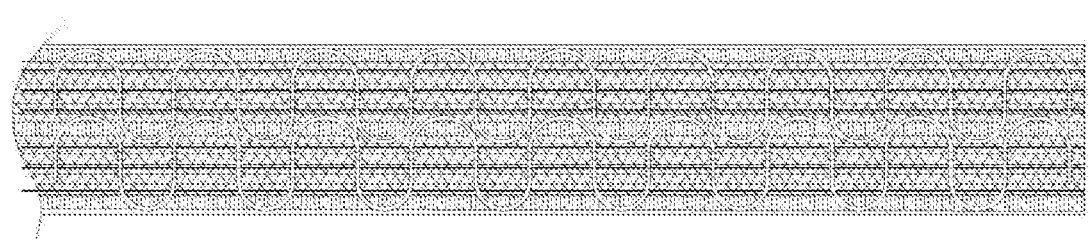
FIG. 4 is a schematic diagram of a conductive module according another embodiment of the present disclosure.
Figure 5:
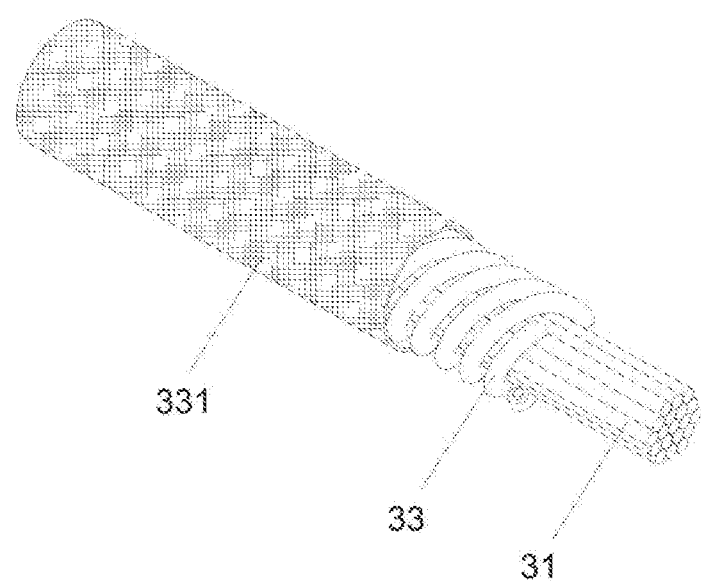
FIG. 5 is a schematic diagram of a conductive module according another embodiment of the present disclosure.
Figure 6:
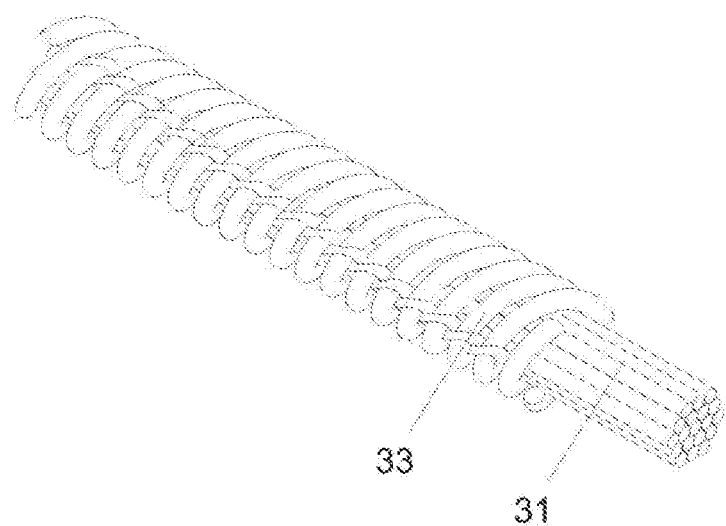
FIG. 6 is a schematic diagram of a conductive module according yet another embodiment of the present disclosure.
Figure 7:
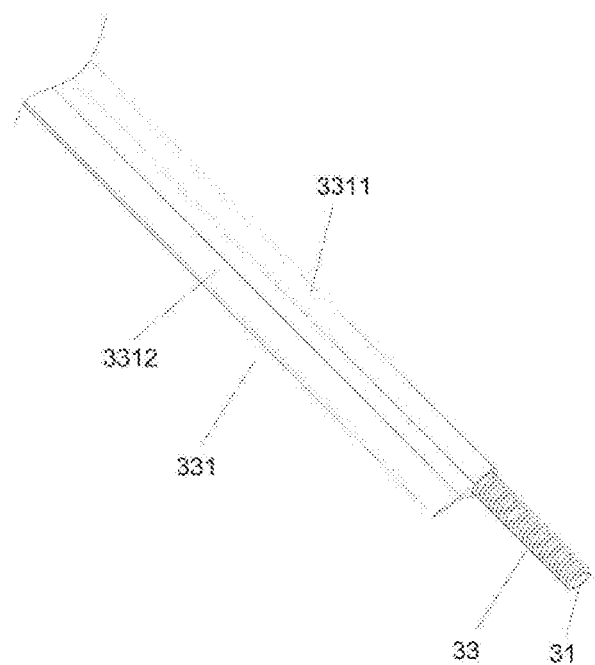
FIG. 7 is a schematic diagram of a conductive module according yet another embodiment of the present disclosure.
Figure 8:
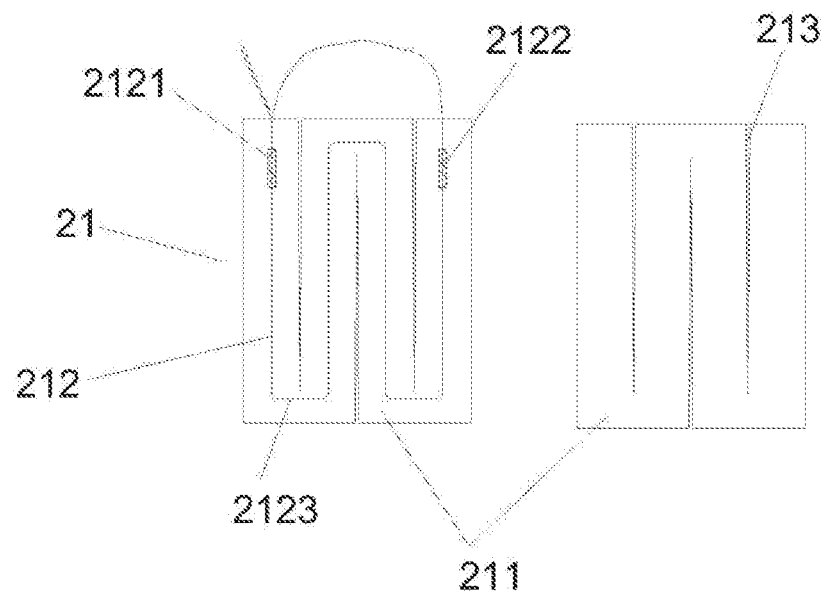
FIG. 8 is a schematic diagram of a heating module according an embodiment of the present disclosure.
Figure 9:
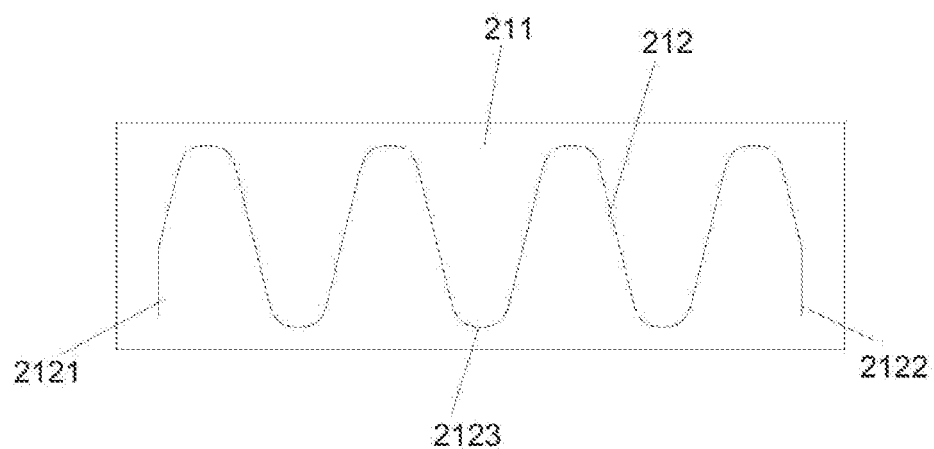
FIG. 9 is a schematic diagram of a heating module according another embodiment of the present disclosure.
Figure 10:
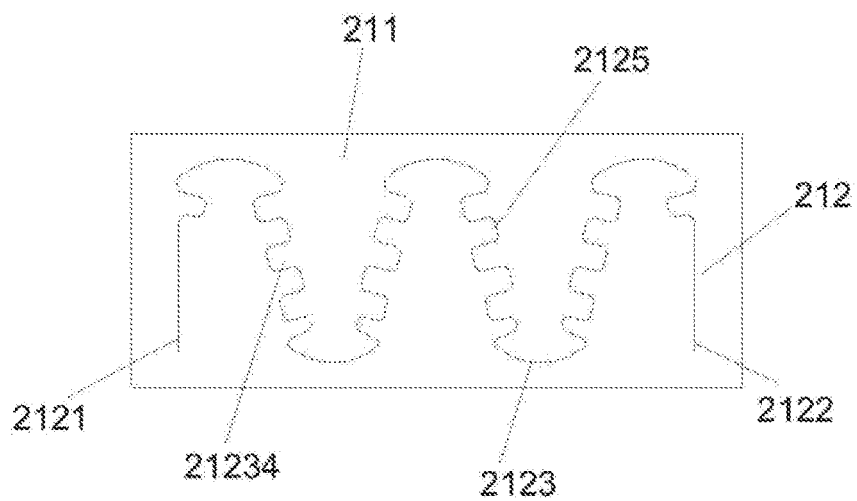
FIG. 10 is a schematic diagram of a heating module according yet another embodiment of the present disclosure.
Figure 11:
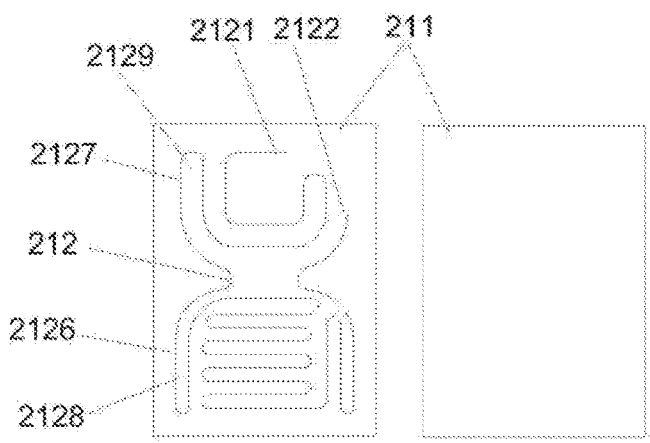
FIG. 11 is a schematic diagram of a heating module according yet another embodiment of the present disclosure.
Figure 12:
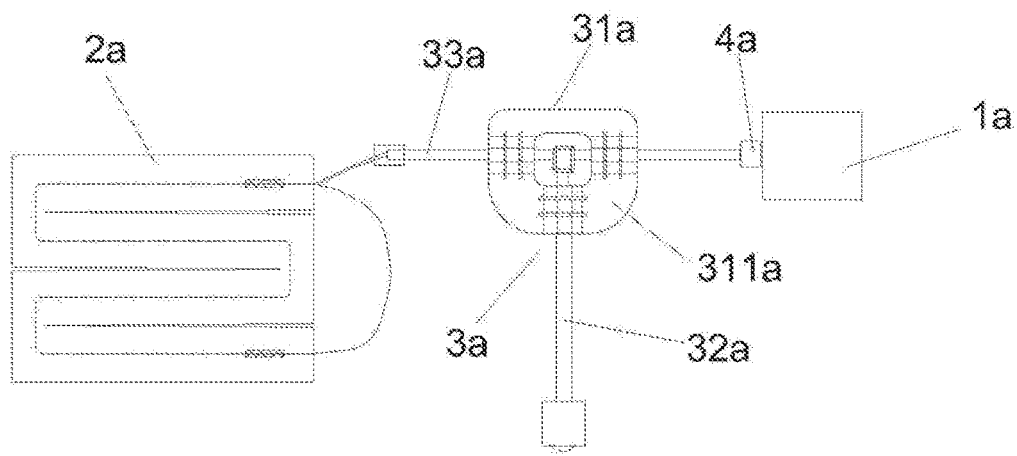
FIG. 12 is a schematic diagram of an electric-heating assembly according to another embodiment of the present disclosure.
Figure 13:
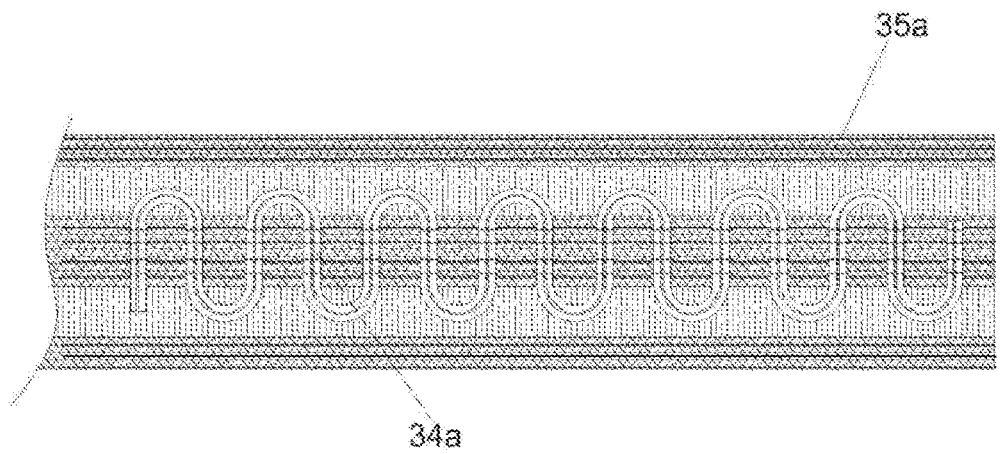
FIG. 13 is a schematic diagram of a conductive module according to an embodiment of the present disclosure.
Figure 14:
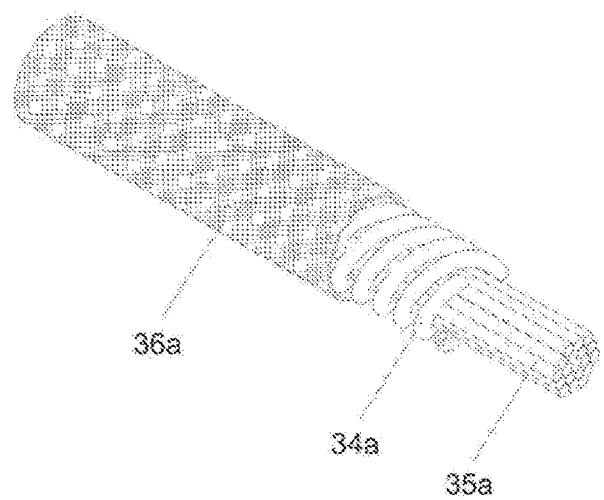
FIG. 14 is a schematic diagram of a conductive module according to another embodiment of the present disclosure.
Figure 15:
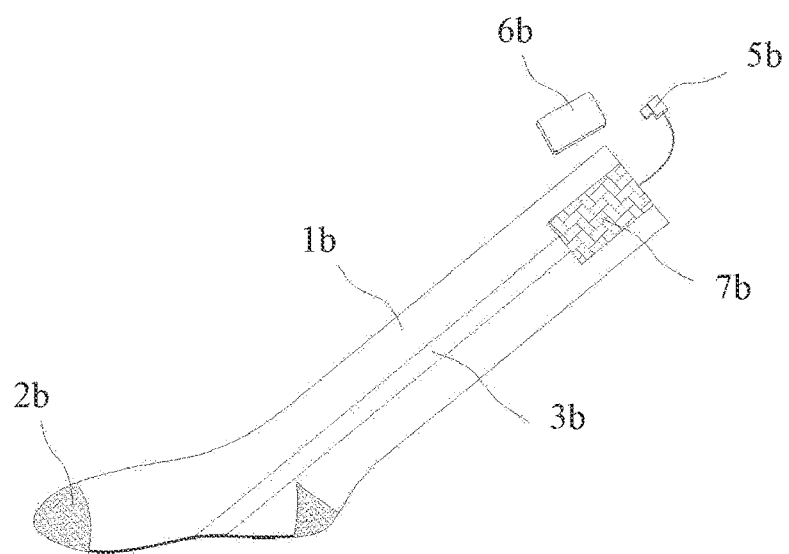
FIG. 15 is a schematic diagram of an electric-heating assembly installed in a sock according to an embodiment of the present disclosure.
Figure 16:
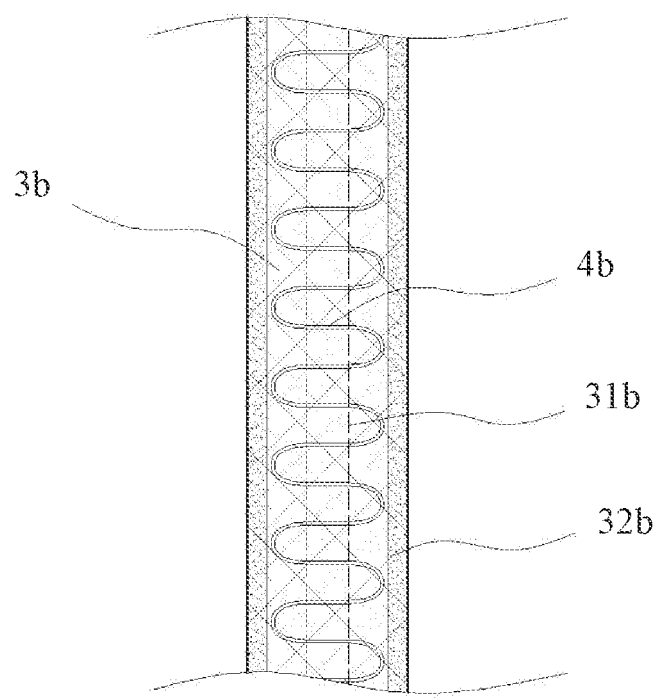
FIG. 16 is a front of a conductive module according to an embodiment of the present disclosure.
Figure 17:
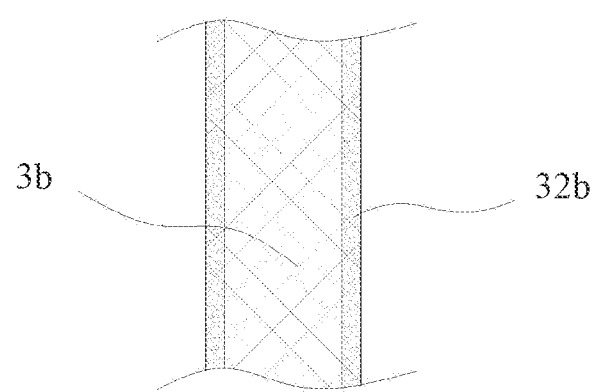
FIG. 17 is a rear view of a conductive module according to an embodiment of the present disclosure.
Figure 18:
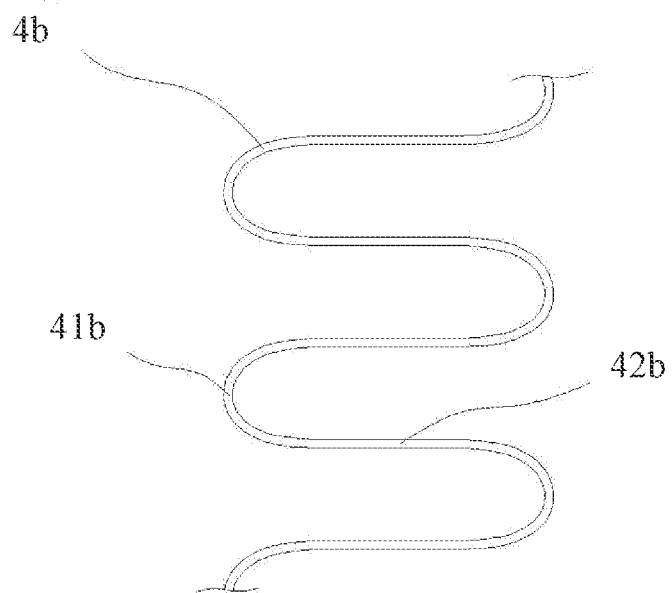
FIG. 18 is a schematic diagram of conductive wires according to an embodiment of the present disclosure.
Figure 19:
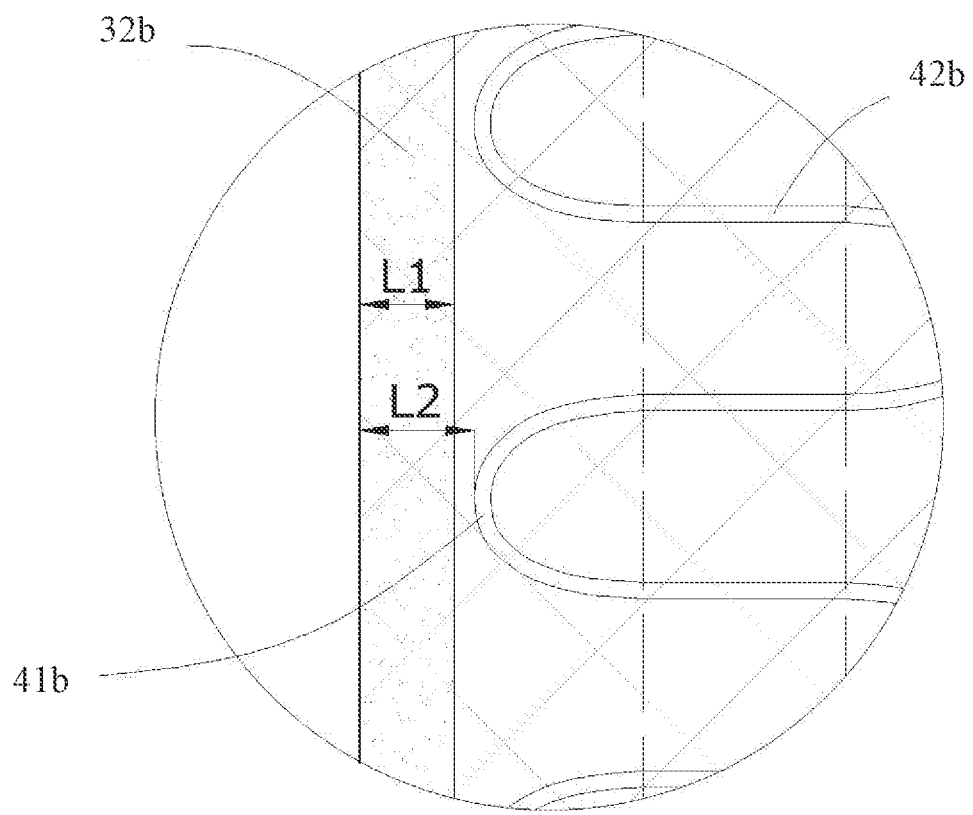
FIG. 19 is a partially enlarged view of FIG. 15.

According to an aspect of the present disclosure, an electric-heating assembly adapted to be attached to an article of clothing is provided, which includes a power supply module 1, a heating module 2, and an electric-conductive module 3. The electric-conductive module 3 is electrically connected between the power supply module 1 and heating module 2 for transmitting electricity from the power supply module 1 to the heating module 2. The electric-conductive module 3 defining a first inlet terminal 31 and a first outlet terminal 32 is formed by fixing at least one pair of conductive wires 33 on an elastic strip 34 in a stretchable manner, and the conductive wires 33 of the same pair respectively allowing electricity to flow in and out to form a closed circuit with other electrical elements are arranged in the same pattern. The electric-heating assembly is controlled by an operable controller 4 to turn on or off. Specifically, the conductive wires 33 of the same pair respectively allowing electricity to flow in and out to form a closed circuit with other electrical elements may be arranged together to be attached to the elastic strip 34 simultaneously, as shown in FIG. 4. Optionally, the conductive wires 33 of the same pair may also be arranged separately as shown in FIG. 5. Here, the conductive wires 33 of the same pair are arranged in the same pattern means that the wires may both be arranged in a zigzag pattern or other patterns, the specific sizes of conductive wires 33 are not limited thereto. Namely, the conductive wires 33 of the same pair may have identical or different sizes.

In some embodiments, the first inlet terminal 31 of the electric-conductive module 3 is connected to an adapter 5, the first outlet terminal 32 of the electric-conductive module 3 is connected to the heating module 2 by a connector 6, and the power supply module 1 is electrically and detachably connected to the adapter 5.

In some embodiments, the connector 6 includes a conductive metal 61 connecting between corresponding conductive wires and an insulation cover 62 encapsulated outside uncovered conductive portions. In an exemplary implementation, the conductive metal 61 is a conductive metal plate, the corresponding conductive wires are attached to opposite sides of the conductive metal plate, and the insulation cover 62 encapsulates outside the uncovered conductive portions by injection molding to fix an insulation layer of the conductive wires with the insulation cover 62. By doing so, the connection between the insulation cover 62 and the insulation layer of the conductive wire can bear the stretching force and protecting the connection joint of the conductive wires. In another exemplary implementation, the conductive metal may be soldering tin, and the insulation cover may be heat-shrinkable tubing. The above implementations are examples of the connector, it should be noted that the connector may also have other structures capable of realizing the effects stated above.

In some embodiments, the elastic strip 34 is a fabric 341 made of strands 342 including elastic threads 343, the conductive wires 33 extend from the first inlet terminal 31 to the first outlet terminal 32 in a zigzag pattern with curved turns 344 in alternating directions, and the conductive wires 33 are fixed on a surface of the fabric 341 by strands 345 weaving together with the fabric 341. In an exemplary implementation, the conductive wires 33 are fixed on a surface of the fabric 341 by strands 345 weaving together with the fabric 341 upon non-curved segments 346 between the curved bends 344. It should be noted that the conductive wires 33 may also be fixed on a surface of the fabric 341 by other methods upon other positions, such as the curved bends 344 etc.

In some embodiments, the fabric 341 defines a length direction from the first inlet terminal 31 to the first outlet terminal 32 and a width direction perpendicular to the length direction. The fabric 341 includes elastic bands 3411 and flexible bands 3412 that are arranged in an alternating manner along the width direction. The flexible bands 3412 are formed by strands 3413 freely connecting between the elastic bands 3411 to provide flexibility when the elastic bands 3412 are stretched, and the conductive wires 33 are fixed in a middle elastic band 3412 of the fabric 341. It should be noted that the conductive wires 33 may also be fixed in other elastic bands, or several pairs of conductive wires 33 may be fixed on the same or different elastic bands 3412 as required.

In some embodiments, the conductive wires 33 are alternatively twisted around the elastic strip 31 in a middle. In an exemplary implementation, a fabric cover 331 is wrapped outside the conductive wires 33. In an exemplary implementation, the fabric cover 331 includes a main body 3311 directly wrapped outside the conductive wires 33 and a connecting portion 3312 extending out from a side of the main body 3311 to be sewed with the clothing.

In some embodiments, the heating module 2 includes one or more heating plates 21, each heating plate 21 includes two fixing covers 211 and a heating wire 212 fixed between the two fixing covers 211, the heating wire 212 defines a second inlet terminal 2121 and a second outlet terminal 2122 to be connected with the first outlet terminal 32, and the heating wire 212 is adapted to extend from the second inlet terminal 2121 to the second outlet terminal 2122 in a second pattern to heat different parts of the clothing in a united intensity or different intensities.

In some embodiments, the heating wire 212 is arranged in a/an regular or irregular zigzag manner with first turns 2123 in alternating directions from the second inlet terminal 2121 to the second outlet terminal 2122.

In some embodiments, segments 2124 between the first turns 2123 are further arranged in a/an regular or irregular zigzag manner with second turns 2125 in alternating directions. The heating wire 212 with first turns 2123 and second turns 2125 may reduce the area of the heating plate while increasing the heating intensity.

In some embodiments, portions of the fixing covers 211 opposite to corresponding turns 2123 of the second pattern are each provided with a cut 213 to provide extra flexibility. Since the elastic strip requires a relatively large tensile strength to be stretched, an article of clothing configured with the heating plate, such as upper or bottom garment, will move with the actions of user before the elastic strip on the heating plate is stretched, which is not comfortable. The first turns and the second turns may have an angular shape or a curved shape etc. A length of the segments between the first turns or the second turns may be long or short which is not limited thereto. By providing the cut 213 of the fixing covers 211 opposite to corresponding turns 2123 of the second pattern, the extensibility of the fixing covers and the heating plate is improved no matter the fixing covers are made of elastic materials or not.

In some embodiments, the heating module 2 includes one or more heating plates 21, each heating plate 21 includes two fixing covers 211 and a heating wire 212 fixed between the two fixing covers 211. The heating wire 212 defines a second inlet terminal 2121 and a second outlet terminal 2122 to be connected with the first outlet terminal 32, and the heating wire 212 is adapted to extend from the second inlet terminal 2121 to the second outlet terminal 2122 in a second pattern. The second pattern of the heating wire 212 includes a first part 2126 and a second part 2127 connected to each other, the first part 2126 defines a first periphery 2128 with zigzag pattern inside the first periphery 2128, and the second part 2127 defines a second periphery 2129 with an irregular rectangle shape inside the second periphery 2129, so that the first part 2126 and the second part 2127 of the heating plate 21 can provide different heating intensities. In an exemplary implementation, the heating plates 21 of this embodiment is applied to socks, the heating plates 21 may be applied to the part of the socks outside the toes on both the upper side and bottom side of the socks or only on one of the upper side and the bottom side of the socks.

In some embodiments, the operable controller 4 is one item selected from a group consisting of a mechanical switcher, an infrared remote controller, a Bluetooth remote controller etc.

According to another aspect of the present disclosure, an electric-heating assembly adapted to be attached to an article of clothing is to provided, which includes: a power supply module 1a, a heating module 2a, and an electric-conductive module 3a. The electric-conductive module 3a is electrically and respectively connected to the power supply module 1a and heating module 2a for transmitting electricity from the power supply module 1a to the heating module 2a. The electric-conductive module 3a includes a wire organizer 31a, a main conductive line 32a led in the wire organizer 31a and slave conductive lines 33a led out from the wire organizer 31a for connecting with the heating module 2a and an adapter 4a to be connected to the power supply module 1a. The adapter 4a may be a USB interface or other interfaces that can be detachably connected to the power supply module 1a. The main conductive line 32a or the slave conductive lines 33a are formed by fixing at least one pair of conductive wires 34a on an elastic strip 35a in a stretchable manner, and the conductive wires 34a of the same pair respectively allowing electricity to flow in and out to form a closed circuit with other electrical elements are arranged in the same pattern. The electric-heating assembly is controlled by an operable controller 4a connected to the main conductive line 32a to turn on or off.

In some embodiments, the conductive wires 34a are alternatively twisted around the elastic strip 35a in a middle.

In some embodiments, a fabric cover 36a is wrapped outside the conductive wires 34a.

In some embodiments, the wire organizer 31a includes an insulation casing 311a for covering and protecting a connection joint of the main conductive line 32a and the slave conductive lines 33a.

Embodiment 1

According to FIGS. 14-19, the present embodiment provides a sock including: a main body 1b defining an opening 11b for wearing the sock, a side surface of the main body 1b near the opening 11b is provided with a battery pocket 7b for receiving a power supply battery. The power supply battery is a rechargeable lithium battery 6b placed in the. An electric-heating plate 2b which is sewn inside the sock is electrically connected to the lithium battery 6b through conductive wires 4b. The conductive wires 4b is each arranged in a zigzag pattern with curved turns 41b in alternating directions and non-curved segments 42b between the curved turns 41b. The curved turns on two ends have a centrosymmetry about the non-curved segments 42b. An elastic strip 3b that can be elastically stretched and deformed has a plurality of sewing threads 311b to sew and fix the conductive wires 4b on the elastic strip 3b upon the non-curved segments 42b. The curved turns 41b allow the conductive wires 4b to stretch and deform with the elastic strip 3b.

The battery pocket 7b is sewn on the main body 1b which allows to put in or take out the lithium battery 6b easily. The lithium battery 6b is small and light which is convenient to carry and install in the battery pocket 7b. The lithium battery 6b is provided with a USB interface, which may be used as a power supply to charge other electronic devices, including mobile phones. Similarly, it is also convenient to charge the lithium battery 6b itself.

The conductive wires 4b is arranged in a zigzag pattern with curved turns 41b in alternating directions and non-curved segments 42b between the curved turns 41b. The non-curved segments 42b is sewn on the elastic strip 3b, and the curved turns 41b are located at two ends of the non-curved segments 42b. The curved turns 41b is centrosymmetrical about the non-curved segments 42b. The elastic strip 3b is elastically stretchable and deformable. Similarly, the main body 1b may also have elasticity. When the elastic strip 3b is sewn on the main body 1b, the elastic strip 3b and the main body 1b may deform and restore synchronously.

The conductive wires 4b are sewn on the elastic strip 3b, so when the elastic strip 3b is stretched, and the conductive wire 4b is also stretched, since the conductive wire 4b is arranged in a zigzag pattern with the curved turns 41b, the curved turns 41b can stretch and restore with the elastic strip 3b. Thus, the conductive wires 4b are able to stretch and restore along with the elastic strip 3b.

As a further improvement, the elastic strip 3b is provided with sewing areas 32b at two sides, the width of the sewing area 32b is defined as L1, and the distance between the outermost point of the curved turns 41b and the edge of the elastic strip 3b is defined as L2, L1 is less than L2.

As a further improvement, the elastic strip 3b is sewn to the main body 1b through the sewing areas 32b. Since L1 is less than L2, the sewing needle will not be inserted into the conductive wires 4b when sewing the thread, so the conductive wires 4b will not be damaged, and the elastic strip 3b can be sewn on the main body 1b smoothly.

As a further improvement, the conductive wires 4b are located between the main body 1b and the elastic strip 3b, so human body will not touch the conductive wires 4b and the sock requires only one layer instead of two layers for placing the conductive wires 4b therebetween, which may increase the thickness of the sock and make it harder to put on shoes and uncomfortable. The solution of the present embodiment can avoid the configuration of two-layer socks, and the conductive wires 4b can be directly sewn on the main body 1b through the elastic strip 3b.

As a further improvement, the heating plates 2b are arranged on the toe part, the middle bottom part or the heel part of the main body 1b of the sock. The heating plates 2b may be arranged on any part of the sock, but it is easier to transfer heat to the foot when the heating plates 2b are arranged on these areas where the users are more likely to feel cold and froze.

As a further improvement, a USB connector 5b is provided at the end of the conductive wires 4b, and the USB connector 5b is electrically connected to the lithium battery 6b. The USB connector 5b is a very common and easy-to-use universal connector. If the lithium battery 6b is out of power, any other portable power sources may used to to power and heat the socks. When washing the socks, a USB waterproof cap may be used to seal and protect the USB connector 5b from water.

As a further improvement, the lithium battery 6b is provided with a three power switching modes, and can continuously supply power for 7-8 hours at the longest. The lithium battery 6b is equipped with a three switching modes, so the user can adjust the mode to set the temperature as required. The first mode provides the lowest heating temperature, the second mode provides a moderate heating temperature, and the third mode provides the highest heating temperature.

As a further improvement, the lithium battery 6b is also provided with a signal receiver, which can be connected to an external switch via infrared or connected to a mobile phone via Bluetooth. The user may controls the power supply of the lithium battery 6 by an external switch. The external switch can be carried around the user and transmit infrared signals to the lithium battery 6b, and the signal receiver in the lithium battery 6 receives the signal to control the power supply. Similarly, the signal receiver may be connected to a mobile phone via Bluetooth, and the power supply of the lithium battery may be controlled by the mobile phone.

It should also be noted that the electric-heating assembly of the present disclosure may also be used on other clothes, such as tops, bottoms, sleeves, gloves etc.

The implementations in the above embodiments may be further combined or replaced, and the embodiments merely describe the preferred embodiments of the present disclosure, without limiting the concept and scope of the present disclosure. All the changes and improvements made by those of ordinary skill in the art to the technical solution of the present disclosure without departing from the design concept of the present disclosure fall within the protection scope of the present disclosure.

What is claimed is:

1. An electric-heating assembly adapted to be attached to an article of clothing comprising: a power supply battery, a heating module, and an electric-conductive module, the electric-conductive module is electrically connected between the power supply battery and heating module for transmitting electricity from the power supply module to the heating module, the electric-conductive module defining a first inlet terminal and a first outlet terminal is formed by fixing at least one pair of conductive wires on an elastic strip in a stretchable manner, wherein the elastic strip comprises woven elastic threads that provide elastic recovery, and the conductive wires of the same pair respectively allowing electricity to flow in and out to form a closed circuit with other electrical elements are arranged in the same pattern; and the electric-heating assembly is controlled by an operable controller to turn on or off;

wherein the first outlet terminal of the electric-conductive module is connected to the heating module by a connector, the connector comprises a conductive metal plate, the corresponding conductive wires are attached to opposite sides of the conductive metal plate, the conductive metal plate partially supports an insulation layer of the conductive wires, and an insulation cover integrally encapsulates outside the conductive metal plate, the conductive wires, and the insulation layer of the conductive wires by injection molding to fix the insulation layer of the conductive wires with the insulation cover;

the heating module comprises one or more heating plates, each heating plate includes two fixing covers and a heating wire fixed between the two fixing covers, the heating wire defines a second inlet terminal and a second outlet terminal to be connected with the first outlet terminal, and the heating wire is adapted to extend from the second inlet terminal to the second outlet terminal to heat different parts of the clothing in a united intensity or different intensities;

the heating wire is arranged in a regular or irregular zigzag manner with first turns in alternating directions from the second inlet terminal to the second outlet terminal, portions of the fixing covers opposite to corresponding turns of the second pattern are each provided with a cut to provide extra flexibility.

2. The electric-heating assembly according to claim 1, wherein the first inlet terminal of the electric-conductive module is connected to an adapter, and the power supply battery is electrically and detachably connected to the adapter.

3. The electric-heating assembly according to claim 1, wherein the elastic strip is a fabric made of strands including elastic threads, the conductive wires extend from the first inlet terminal to the first outlet terminal in a zigzag pattern with curved turns in alternating directions, and the conductive wires are fixed on a surface of the fabric by strands weaving together with the fabric.

4. The electric-heating assembly according to claim 3, wherein the conductive wires are fixed on a surface of the fabric by strands weaving together with the fabric upon non-curved segments between the curved turns.

5. The electric-heating assembly according to claim 3, wherein the fabric defines a length direction from the first inlet terminal to the first outlet terminal and a width direction perpendicular to the length direction, the fabric includes elastic bands and flexible bands that are arranged in an alternating manner along the width direction, the flexible bands are formed by strands freely connecting between the elastic bands to provide flexibility when the elastic bands are stretched, and the conductive wires are fixed in a middle elastic band of the fabric.

6. The electric-heating assembly according to claim 5, wherein a fabric cover is wrapped outside the conductive wires.

7. The electric-heating assembly according to claim 1, wherein the conductive wires are alternatively twisted around the elastic strip in a middle.

8. The electric-heating assembly according to claim 7, wherein the fabric cover comprises a main body directly wrapped outside the conductive wires and a connecting portion extending out from a side of the main body to be sewed with the clothing.

9. The electric-heating assembly according to claim 1, segments between the first turns are further arranged in a regular or irregular zigzag manner with second turns in alternating directions.

10. The electric-heating assembly according to claim 1, wherein the heating module comprises one or more heating plates, each heating plate includes two fixing covers and a heating wire fixed between the two fixing covers, the heating wire defines a second inlet terminal and a second outlet terminal to be connected with the first outlet terminal, and the heating wire is adapted to extend from the second inlet terminal to the second outlet terminal in a second pattern, the second pattern of the heating wire includes a first part and a second part connected to each other, the first part defines a first periphery with zigzag pattern inside the first periphery, and the second part defines a second periphery with an irregular rectangle shape inside the second periphery, so that the first part and the second part of the heating plate can provide different heating intensities.

11. The electric-heating assembly according to claim 1, wherein the operable controller is one item selected from a group consisting of a mechanical switcher, an infrared remote controller, a Bluetooth remote controller.

\* \* \* \* \*